United States Patent
Kinnunen

(10) Patent No.: US 7,277,385 B2
(45) Date of Patent: Oct. 2, 2007

(54) CONFIGURABLE STATISTICAL DATA STRUCTURE

(75) Inventor: Matti Kinnunen, Helsinki (FI)

(73) Assignee: Nokia Corporation, Espoo (FI)

( * ) Notice: Subject to any disclaimer, the term of this patent is extended or adjusted under 35 U.S.C. 154(b) by 1052 days.

(21) Appl. No.: 10/212,135

(22) Filed: Jul. 25, 2002

(65) Prior Publication Data

US 2003/0107993 A1    Jun. 12, 2003

Related U.S. Application Data

(63) Continuation of application No. PCT/EP00/00692, filed on Jan. 28, 2000.

(51) Int. Cl.
*G06F 11/00* (2006.01)
*H04L 12/28* (2006.01)

(52) U.S. Cl. .................................. 370/230; 370/395.2

(58) Field of Classification Search ............ 370/395.1, 370/395.2, 395.21, 395.7, 395.72, 230–232, 370/252

See application file for complete search history.

(56) References Cited

U.S. PATENT DOCUMENTS

| 5,251,152 A | * | 10/1993 | Notess .................. 709/224 |
| 5,982,748 A | * | 11/1999 | Yin et al. .............. 370/232 |
| 6,412,000 B1 | * | 6/2002 | Riddle et al. ........... 709/224 |
| 6,771,598 B1 | * | 8/2004 | Andrews ............... 370/230 |

FOREIGN PATENT DOCUMENTS

| EP | 0847221 | 6/1998 |
| WO | 9219054 | 10/1992 |

* cited by examiner

*Primary Examiner*—Doris H. To
*Assistant Examiner*—Kerri M Rose

(57) ABSTRACT

A method for generating a data structure for statistical information used at a request for a communication connection via connection points, the method comprising the steps of defining parameters of the data structure, the parameters classifying the request, receiving information concerning the request for the communication connection, allocating the information to the defined parameters, and setting the parameters according to the allocated information in order to determine a distribution of the requests in relation to the defined parameters. A corresponding device is also shown.

27 Claims, 2 Drawing Sheets

CONFIGURABLE STATISTICAL DATA STRUCTURE

CROSS-REFERENCE TO RELATED APPLICATION

This application is a continuation of International Application PCT/EP00/00692 having an international filing date of Jan. 28, 2000 and from which priority is claimed under all applicable sections of Title 35 of the United States Code including, but not limited to, Sections 120, 363 and 365(c).

FIELD OF THE INVENTION

The present invention relates to a method for generating a data structure for statistical information and also to a corresponding device. In particular, the present invention is directed to a method and corresponding device for generating a data structure for obtaining statistical data in, e.g., a communication network using an asynchronous transfer mode ATM.

BACKGROUND OF THE INVENTION

In recent years, the importance of telecommunication systems increases more and more. Since the number of users as well as the load of the telecommunication network due to new communication services such as multimedia and the like grow, improved transmission methods are developed to ensure a reliable and sufficiently high data transfer, and monitoring of the communication networks has to be performed to recognize the performance level.

One approach for an improved transmission method is the asynchronous transfer mode (ATM) which represents a packet switching protocol providing a rapid transmission of data in broadband networks.

The ATM network comprises several network elements, for example so-called ATM switches. Said network elements are connected, e.g., to other ATM switches, or other network elements such as multiplexers, terminal devices, user equipment or the like.

To establish a connection between two ATM network elements, for example, due to a request for connection between two users, an ATM switch has to perform a channel selection (CS) or routing by routing algorithms to select a channel used for data transfer. The connection can be established, for example, by a virtual path (VP) or a virtual channel (VC), which depends on the selected connection type. When a channel is selected, a connection admission control (CAC) is executed to check whether the currently selected channel can accommodate the required new connection.

If the CAC decides that the currently selected channel is sufficient to the requirements of the connection request, the selected connection is assumed as succeeded, and the connection between the two ATM network elements is established. Otherwise, if the CAC decides that the currently selected channel is not sufficient, the selected connection is assumed as failed, and a new channel is to be selected by the CS.

In the channel selection, there is a hierarchical order of objects. The smallest unit of said order is a so-called end point, for example an end point of a VC connection, if the selected connection type is a VC type, or an end point of a VP connection, if the selected connection type is a VP type. The next stage is a so-called end point group which comprises several end points with common characteristics. Finally, a so-called route is defined which comprises end point groups.

For the connection itself, different transmission modes can be requested. For example, it is possible to request a constant bit rate (cbr) transmission service or a variable bit rate (vbr) (e.g. a real time variable bit rate (rtvbr)) transmission service. Moreover, the required bit rate, i.e. the bandwidth, for the respective transmission service can be set. For the above mentioned CAC, it is therefore necessary to check whether or not the selected channel is able to perform the transmission with the set conditions (transmission service type, bandwidth).

As mentioned above, the network performance is to be monitored, for example, in order to decide whether the existing network structure is sufficient or how it is to be improved. For this purpose, it is necessary to gain statistical data of communication services such as channel selection or the like. This statistical data should inform, for example, about the requested bandwidth, the requested transmission mode, whether the request was successful or not, and the like, in combination with a correct identification of the respective end point or the like in the network to which the request is directed.

In this connection, a problem exists to measure and keep statistical data of a working channel selection algorithm. Moreover, it is difficult to adapt the respective statistical data obtaining method to different requirements and/or network abilities. Furthermore, a method which may provide a sufficient flexibility in obtaining the statistical data is complex, and hence a high processing power is needed to perform the respective measurements, which in turn increases costs.

SUMMARY OF THE INVENTION

Therefore, it is an object of the present invention to provide a method for generating a flexible data structure for statistical information, and/or a corresponding device.

According to the present invention, this object is achieved by a method for generating a data structure for statistical information used at a request for a communication connection via connection points, said method comprising the steps of defining parameters of said data structure, said parameters classifying said request, receiving information concerning said request for said communication connection, allocating said information to said defined parameters, and setting said parameters according to said allocated information in order to determine a distribution of said requests in relation to said defined parameters.

Furthermore, the present invention proposes a device for generating a data structure for a statistical information used at a request for a communication connection via connection points, said device comprising defining means for defining parameters of said data structure, said parameters classifying said request, receiving means for receiving information concerning said request for said communication connection, allocating means for allocating said information to said defined parameters, and setting means for setting said parameters according to said allocated information in order to determine a distribution of said requests in relation to said defined parameters.

Advantageous further developments of the present invention are as set out in the respective dependent claims.

According to the present invention, the proposed method and/or device are very easy to implement. Advantageously, the present invention offers a high flexibility in application since it can easily be adapted by changing, for example, the kind or content of defined parameters.

As an example, parameters which can be defined are e.g. a request status indicating whether said request for said communication connection has failed or succeeded, a bandwidth required for said requested communication connection, a transmission mode, e.g., constant bit rate (cbr) or variable bit rate (vbr). By defining different connection point classes, it is possible to discriminate end points, end point groups which contain end points, routes which contain end point groups, and the like. This enables a detailed and correct identification of connection points, such as an ATM network element, in the monitored communication network. The present invention can be used for communication connection by virtual path (VP) connections as well as by virtual channel (VC) connections.

By using the present invention, it is possible to determine in a flexible manner, for example, how many connection requests of a certain transmission type (cbr, rtvbr) have succeeded, and how many have failed. Further, it is e.g. possible to determine peak cell rates of requests or the like.

The present invention is most preferably used in connection with an ATM switch. Here, it is possible to use the present invention to gain statistical data of a channel selection (CS) function or routing algorithms, but also, with minor adaptations, of a connection admission control (CAC) function.

In case of an ATM network, when a channel selection is to be monitored, the information used for generating the statistics is received for example from the connection admission control (CAC) function. However, it is easy to understand that the present invention can be used also in connection with other network elements delivering information usable for generating statistics.

Furthermore, the present invention offers the advantage that the kind of representation of the distribution obtained by the statistical data can be easily set. For example, a linear or a logarithmic representation is possible. Further, a processing of the determined distribution can be performed in order to use a graphical user interface for the representation.

A preferred embodiment of the invention is described hereinbelow in detail by way of example with reference to the accompanying drawings.

DESCRIPTION OF THE PREFERRED EMBODIMENT

Figure 1:
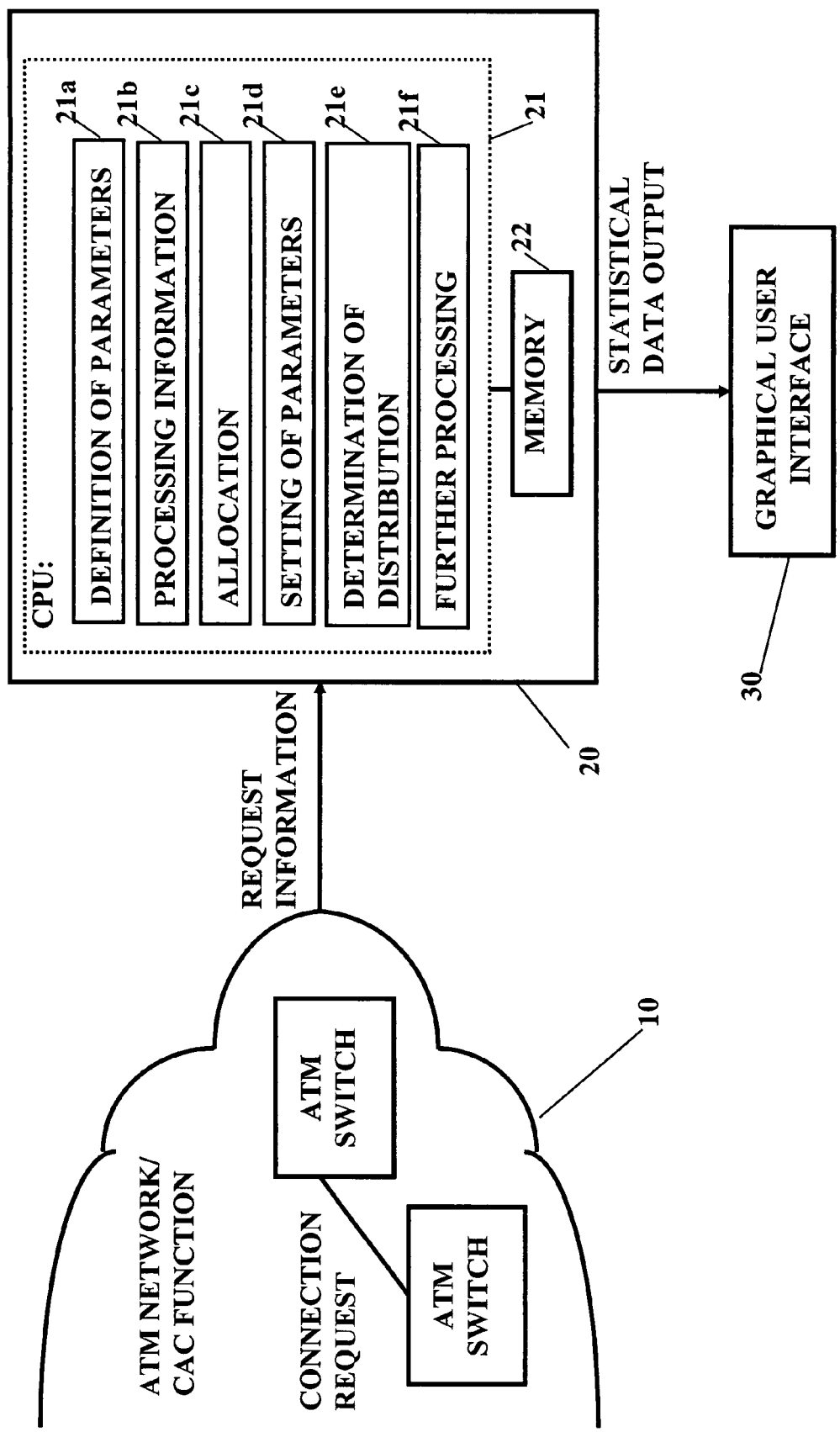
FIG. 1 shows a block circuit diagram of a device for generating a data structure according to the present invention.

With reference to FIG. 1, a block circuit diagram of a configuration according to the present invention is shown.

In FIG. 1, reference number 10 denotes an ATM network comprising several network elements such as ATM switches or the like. In the case that a connection with certain conditions (required bandwidth, transmission mode and the like) has to be established in the network, a corresponding request is sent from one network element (end point, connection point) to other elements in order to obtain a sufficient channel by using a channel selection CS function.

When a channel is selected, a connection admission control CAC function checks whether the currently selected channel is sufficient for the requested connection or not (i.e., for example, request has failed or succeeded).

The information concerning the request, i.e. the data about failing or succeeding, bandwidth, transmission type and the like, is input to a signal processing device 20, which can be for example include a central processing unit CPU 21, for performing statistical processing by generating a corresponding data structure.

For the generation of said data structure, the device 20 executes several functions, which will be described with reference to FIG. 2 below. The CPU 21 is connected to a memory 22, as shown, for storing instructions, data and the like.

The device 20 is also connected to a graphical user interface 30 to which determined statistical distribution data is output in order to represent it in a form to be decided on, for example, by the user (i.e. for example in a logarithmic or a linear form).

Depending on the network architecture, the device 20 can be included in a network element such as an ATM switch or the like, or be a separate part in the network structure.

The operation performed to determine the statistical data according to the present invention is now described with reference to FIG. 2.

Figure 2:
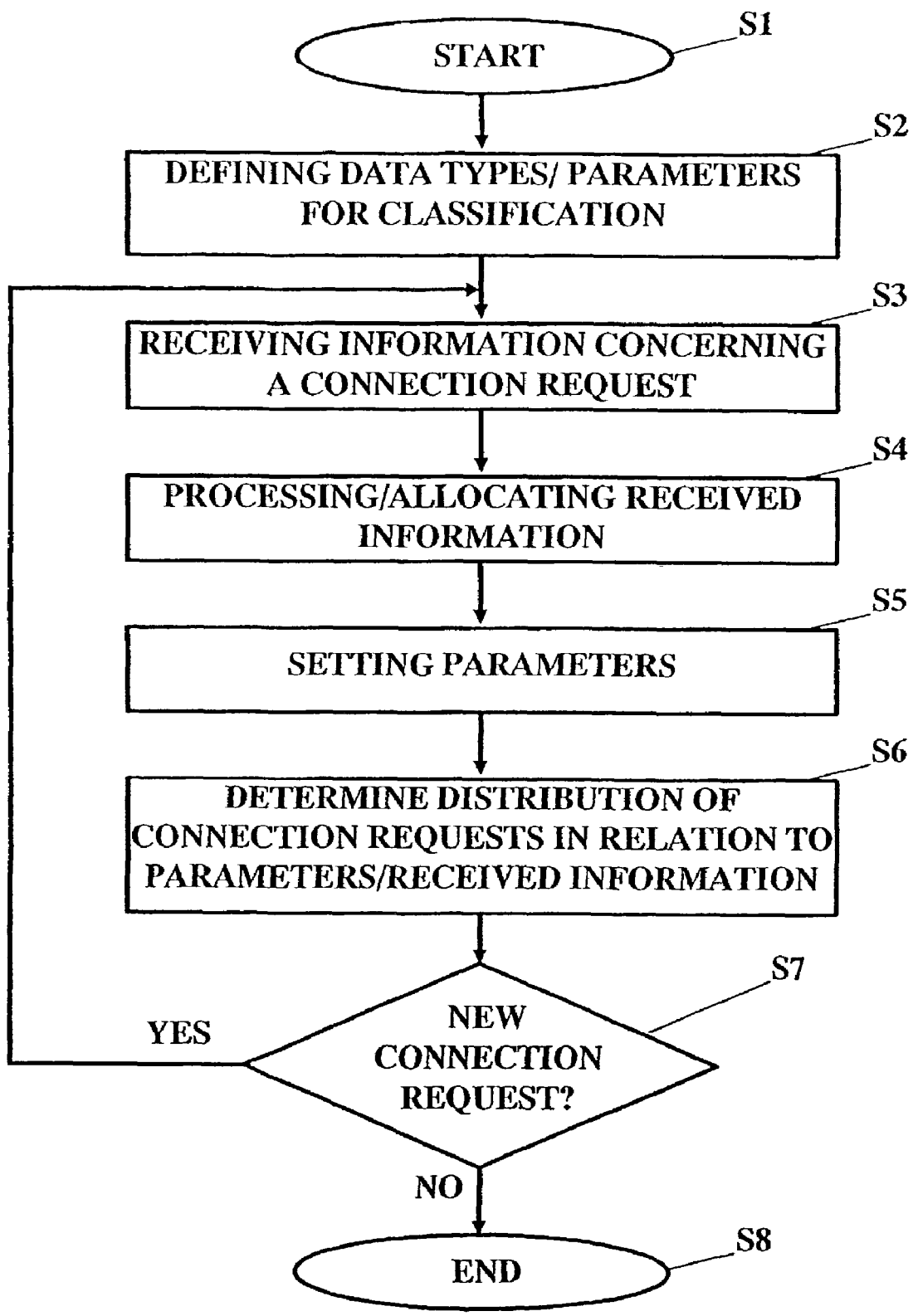
FIG. 2 shows a flow chart for generating a data structure according to the present invention.

In FIG. 2, a flow chart is shown illustrating the steps performed to generate a data structure according to the present invention.

First, in step S2, data types for parameters are defined which classify connection requests and are used for the statistics. Such could be carried out by a functional block 21a of the CPU 21 of the device 20 of FIG. 1, for instance. In this embodiment, the relevant parameters are whether the respective connection request has failed or succeeded, the bandwidth, and the requested transmission type (constant bit rate cbr, variable bit rate vbr). Furthermore, data types for classifying end points, end point groups, and routes are defined.

However, if other parameters are to be registered in statistics, they can easily be added by defining a corresponding data type.

When a request for a connection in the network has been made, corresponding data containing information related to the conditions of this request is received (step S3), for instance in a means 21b for receiving and processing such information.

In step S4, the received data is processed, for instance by the means 21b, in order to identify the information contained therein, and the information is allocated to the corresponding defined data type (parameter). The step of allocating can be carried out by means for allocation 21c as shown in FIG. 1, for instance. As an example, the information of success or failure of connection is allocated to the corresponding data type, and so on.

After the information is allocated correctly to the corresponding parameter, the parameters are set for determining how the current request is to be included in the statistics (step S5). Such could be carried out in a means for setting parameters 21d as shown in FIG. 1, for instance. The order of said setting is to be defined, for example, by the network operator, in order to obtain all relevant statistical data needed for the desired statistics.

Now, a distribution of connection requests can be obtained (step S6). That is, statistical data are updated according to the determination described above, for example, by counting the number of requests of a certain kind identified by the parameters allocated. This step S6 can for instance be carried out in a means for determining a distribution 21e as shown in FIG. 1.

If a new connection request is made in the network (step S7), the process is repeated from step S3, which results in a further updating of the statistics.

As an alternative, it is also possible to define an auxiliary parameter by means of which different types of distribution can be set. For example, it is possible to define a linear representation or a logarithmic representation. Similar to the above described data types for the parameters, it is easy to change the used distribution type by changing said auxiliary type correspondingly.

Although not shown in FIG. 2, a further processing of the distribution data can be performed in order to enable the usage of, e.g., a graphical user interface. Such further processing can be carried out by means for further processing 21f, for instance, as shown in FIG. 1.

Next, an example for a data structure generated by the present invention is given. Here, the used programming language is a specification description language (SDL). However, it is obvious for a person skilled in the art, that the used programming language could be also a different one, such as C or the like.

The corresponding method steps are indicated in brackets at the respective program parts.

First, a data type either_t is defined (step S2). It embodies the fact that each request either fails or succeeds.

```
TYPE either_t
    REPRESENTATION
        STRUCT
            failed    dword;    /* number of failed requests */
            succeeded dword;    /* number of successful request */
            successful = CAC accepted
        ENDSTRUCT;
ENDTYPE either_t
COMMENT 'General type for counting requests';
```

Furthermore, a data type by_bw_t for classifying the request by the bandwidth is defined (step S2). By defining a constant num_of_slots the number of slots used can be categorized.

```
TYPE by_bw_t
CONSTANT num_of_slots = 10;
REPRESENTATION
    STRUCT
        ARRAY (num_of_slots) OF either_t;
    ENDSTRUCT;
ENDTYPE by_bw_t
COMMENT 'General type for classifying requests by bandwidth';
```

Next, the connection points are defined, i.e. the end points in the ATM network (step S2). Concerning each endpoint, a certain number of successful and unsuccessful requests exists which all have some bandwidth requirement. As mentioned above, for example, two service categories are present: constant bit rate (cbr) and variable bit rate (vbr) such as real time variable bit rate (rtvbr).

```
TYPE end_point_t
REPRESENTATION
    total_requests   either_t;  /* total number of requests */
    cbr_by_bw        by_bw_t;
    rtvbr_by_bw      by_bw_t;
ENDTYPE end_point_t
COMMENT 'Number of request on a end point';
```

An end point group (epg) consists of several end points. In this example, the data structure is designed to examine how many requests concerning a certain end point group have succeeded and which kind of bandwidth distribution they had. Here, it is assumed that each end point group has less than 1000 endpoints.

```
TYPE end_point_group_t
    CONSTANT
        max_num_of_end_points_in_a_epg = 1000;
    REPRESENTATION
        STRUCT
            total_requests  either_t;/* total number of requests for epg */
            by_bw           by_bw_t;
            cbr_requests    either_t;/* how many cbr requests */
            cbr_by_bw       by_bw_t;
            rtvbr_requests  either_t;/* how many rtvrb requests */
            rtvbr_by_bw     by_bw_t;
            /* and so on */
            list  ARRAY (max_num_of_end_points_in_a_epg) OF end_point_t;
        ENDSTRUCT;
ENDTYPE end_point_group_t
COMMENT 'Number of different requests on an end point group';
```

Analogously, as mentioned above, a route consists of several end point groups.

```
TYPE route_t
    CONSTANT
        max_num_of_endpointgroups_in_a_route = 1000;
    REPRESENTATION
        STRUCT
            total_requests  either_t;/* total number of requests for this route */
            by_bw           by_bw_t;
            cbr_requests    either_t;/* how many cbr requests */
            cbr_by_bw       by_bw_t;
            rtvbr_requests  either_t;/* how many rtvrb requests */
            rt_vbr_by_bw    by_bw_t;
            /* and so on */
            list ARRAY
            (max-num_of_
            endpointgroups_
            in_a_route) OF
end_point_group_t;
        ENDSTRUCT;
ENDTYPE route_t
COMMENT 'Number of different requests on a route';
```

Now, all parameters necessary for the statistics are defined. Next, it is described how these data structures are used.

First, a maximum bandwidth for end points is decided, for example 10000. When receiving a request for a cbr connection with bandwidth of 2345 (step S3), the channel selection (CS) function decides to try whether e.g. an end point 1 in an endpoint group 2 can accommodate this connection (step S4).

For the calculation, it is necessary to declare a variable, which is introduced in the process for example by DCL route_t.

Assuming now that the request succeeds, i.e. the CAC function accepts the currently chosen connection. For the statistics, the following procedure is then performed, by which the corresponding statistic is updated (steps S5 and S6):

```
/* for route */
route.total_request.succeed := route.total_request.succeed +1
route.by_bw(int(2345/10000*10)).succeed: =
route.by_bw(int(2345/10000*10)).succeed +1
route.cbr-requests.succeed := route.cbr_requests.succeed +1
route.cbr_by_bw(int(2345/10000*10)).succeed :=
route.cbr_by_bw(int(2345/10000*10)).succeed +1
/* for end point group */
route.list(2).total_requests.succeed := route.list(2).total requests.succeed+1
/* etc. as for route above */
/* for end point */
route.list(2).list(1).total_requests.succeeed :=
route.list(2).list(1).total_requests.succeeed+1
route.list(2).list(1).by bw(int(2345/10000*10)) :=
route.list(2).list(1).by bw(int(2345/10000*10))+1
```

In the case that the request has failed, the data structure is changed accordingly just by replacing succeeds with failed.

In the above described case, a linear distribution is used. However, if a logarithmic distribution (base 10) is to be used, the expression int(2345/10000*10)) is to be replaced by int(log(2345)). As can be seen, it is easy to define different distributions.

To facilitate the using of different distributions, an auxiliary type is defined:

```
TYPE distribution_t
    REPRESENTATION
    STRUCT
        kind ENUM lin, log ENDENUM;
        values UNION
            lin_p STRUCT
                divisor     dword;
            ENDSTRUCT;
            log_p STRUCT
                divisor     dword;
                base        dword;
            ENDSTRUCT;
            /* more distribution can be added */
        ENDUNION;
    ENDSTRUCT;
ENDTYPE distribution_t
```

For implementation of this auxiliary type distribution_t, for example, the type route_t has to be provided with the following:

scale distribution_t

Now, the procedures which update the data structure know how they should calculate the correct array slots they use.

It is also be easy to understand that a data structure which has previously used linear indexing can be transformed into one which uses logarithmic indexing.

As described above, the present invention proposes a method for generating a data structure for statistical information used at a request for a communication connection via connection points, said method comprising the steps of defining parameters of said data structure, said parameters classifying said request, receiving information concerning said request for said communication connection, allocating said information to said defined parameters, and setting said parameters according to said allocated information in order to determine a distribution of said requests in relation to said defined parameters. The present invention also proposes a corresponding device.

It should be understood that the above description and accompanying figures are merely intended to illustrate the present invention by way of example only. The preferred embodiments of the present invention may thus vary within the scope of the attached claims.

The invention claimed is:

1. A method for execution by a signal processor, comprising:
defining parameters of a data structure for statistical information used at a request for a communication connection via connection points in a communication network, said parameters for classifying said request;
receiving request information concerning said request for said communication connection in a signal from said communication network;
allocating said request information to said defined parameters; and
setting said parameters according to said allocated information in order to determine a distribution of requests in relation to said defined parameters, wherein said defined parameters comprise a request status indicating whether said request for said communication connection has failed or succeeded.

2. A method according to claim 1, wherein said defined parameters comprise a bandwidth required for said requested communication connection.

3. A method according to claim 1, wherein said defined parameters comprise a transmission mode indicating a constant bit rate or a variable bit rate.

4. A method according to claim 1, wherein said information is received from a connection admission control function.

5. A method according to claim 1, wherein said determined distribution is represented in a linear form.

6. A method according to claim 5, further comprising processing said determined distribution for representation on a graphical user interface.

7. A method according to claim 1, wherein said communication connection via connection points is performed by virtual channels.

8. A method according to claim 1, wherein said method is implemented by using a programming language stored as coded instructions on a computer readable medium.

9. A method according to claim 1, wherein said data structure for statistical information is used for a request for a communication connection by an asynchronous transfer mode switch.

10. A method according to claim 1, said method being used for obtaining statistics concerning a channel selection function or routing algorithm.

11. A method according to claim 1, said method being used for obtaining statistics concerning a connection admission control function.

12. A method for execution by a signal processor comprising:
defining parameters of data structure for statistical information used at a request for a communication connec tion via connection points in a communication network, said parameters for classifying said request;

receiving request information concerning said request for said communication connection in a signal from said communication network;

allocating said request information to said defined parameters; and setting said parameters according to said allocated information in order to determine a distribution of requests in relation to said defined parameters, wherein said defined parameters comprise connection point classes comprising at least one of a class of end points, a class of end point groups each of which contains at least one end point, and a class of routes each of which contains at least one end point group.

13. A method for execution by a signal processor, comprising:

receiving a signal from a communication network having information concerning a request for a communication connection via connection points in said communication network;

allocating said information to predefined parameters for generating a data structure for statistical information used at said request, said parameters classifying said request; and setting said parameters according to said allocated information in order to determine a distribution of requests in relation to said defined parameters, wherein said determined distribution is represented in a logarithmic form.

14. A method for execution by a signal processor, comprising:

receiving a signal from a communication network having information concerning a request for a communication connection via connection points in said communication network;

allocating said information to predefined parameters for generating a data structure for statistical information used at said request, said parameters classifying said request; and setting said parameters according to said allocated information in order to determine a distribution of requests in relation to said defined parameters, wherein said communication connection via connection points is performed by virtual paths.

15. A device comprising a signal processor and a memory, said signal processor comprising:

defining device for defining parameters of a data structure for statistical information used at a request for a communication connection via connection points in a communication network, said parameters for classifying said request;

receiving request device for receiving information concerning said request for said communication connection in a signal from said communication network;

allocating device for allocating said request information to said defined parameters; and setting device for setting said parameters according to said allocated information in order to determine a distribution of requests in relation to said defined parameters, wherein said defining device is adapted to define a request status indicating whether said request for said communication connection has failed or succeeded.

16. A device according to claim 15, wherein said defining device is adapted to define a bandwidth required for said requested communication connection.

17. A device according to claim 15, wherein said defining device is adapted to define a transmission mode indicating a constant bit rate or a variable bit rate.

18. A device according to claim 15, wherein said receiving device is adapted to receive said information from a connection admission control function.

19. A device according to claim 15, wherein said determined distribution is represented in a linear form.

20. A device according to claim 19, said device further comprises processing device for processing said determined distribution to be represented on a graphical user interface.

21. A device according to claim 15, wherein said communication connection via connection points is performed by virtual channels.

22. A device according to claim 15, wherein said data structure for statistical information is used for a request for a communication connection by an asynchronous transfer mode switch.

23. A device according to claim 15, said device being used for obtaining statistics concerning a channel selection function or routing algorithm.

24. A device according to claim 15, said method being used for obtaining statistics concerning a connection admission control function.

25. A device comprising a signal processor and a memory, said signal processor comprising:

defining device for defining parameters of a data structure for statistical information used at a request for a communication connection via connection points in a communication network, said parameters for classifying said request;

receiving device for receiving request information concerning said request for said communication connection in a signal from said communication network;

allocating device for allocating said request information to said defined parameters; and setting device for setting said parameters according to said allocated information in order to determine a distribution of requests in relation to said defined parameters, wherein said defining device is configured to define connection point classes comprising at least one of a class of end points, a class of end point groups each of which contains at least one end point, and a class of routes each of which contains at least one end point group.

26. A device comprising a signal processor and a memory, said signal processor comprising:

receiving device for receiving a signal from a communication network having information concerning a request for a communication connection via connection points in said communication network;

allocating device for allocating said information to predefined parameters for generating a data structure for statistical information used at said request, said parameters classifying said request; and setting device for setting said parameters according to said allocated information in order to determine a distribution of requests in relation to said defined parameters, wherein said determined distribution is represented in a logarithmic form.

27. A device comprising a signal processor and a memory, said signal processor comprising:

receiving device for receiving a signal from a communication network having information concerning a request for a communication connection via connection points in said communication network;

allocating device for allocating said information to predefined parameters for generating a data structure for statistical information used at said request, said parameters classifying said request; and setting device for setting said parameters according to said allocated information in order to determine a distribution of requests in relation to said defined parameters, wherein said communication connection via connection points is performed by virtual paths.

* * * * *

UNITED STATES PATENT AND TRADEMARK OFFICE
CERTIFICATE OF CORRECTION

| | |
|---|---|
| PATENT NO. | : 7,277,385 B2 |
| APPLICATION NO. | : 10/212135 |
| DATED | : October 2, 2007 |
| INVENTOR(S) | : Kinnunen |

It is certified that error appears in the above-identified patent and that said Letters Patent is hereby corrected as shown below:

In column 7, lines 46 and 47 "dword;" should be moved to the left so as to appear similar to that shown in line 42.
In column 8, line 66, claim 12, line 3 after "of" -- a -- should be inserted.

Signed and Sealed this

Twenty-third Day of December, 2008

JON W. DUDAS
*Director of the United States Patent and Trademark Office*